United States Patent [19] [11] 3,707,801
Gednalske [45] Jan. 2, 1973

[54] FISHING ROD HOLDER WITH BEEPER
[76] Inventor: Louis Gednalske, Second Street, Dell Rapids, S. Dak. 57022
[22] Filed: Dec. 21, 1971
[21] Appl. No.: 210,407

[52] U.S. Cl. ...................................................43/17
[51] Int. Cl. ............................................A01k 97/12
[58] Field of Search.........................................43/17

[56] References Cited

UNITED STATES PATENTS

| | | | |
|---|---|---|---|
| 2,704,411 | 3/1955 | Carroll | 43/17 |
| 3,156,997 | 11/1964 | Smith | 43/17 |
| 3,285,360 | 11/1966 | Wetsch | 43/17 |
| 3,359,672 | 12/1967 | Schwartz et al. | 43/17 |
| 3,628,275 | 12/1971 | Howard | 43/17 |

Primary Examiner—Hugh R. Chamblee
Assistant Examiner—Daniel J. Leach
Attorney—Frank C. Maley

[57] ABSTRACT

A tubular fishing rod holder is fixedly superimposed axially on the front face of an inherently flexible but sturdy vertical supporting standard, that is adapted to be staked in the ground or attached to a boat or similar support, and an alarm casing is fixed to such face of the standard immediately below the lower open end of the holder. Such casing provides a bottom for the holder, in which the butt end of a fishing rod is snugly socketed, and encloses a self-contained alarm unit that has a switch contact button slidably disposed through the front face of the casing. The button is activated by an overlying finger that integrally depends from the front portion of the edge of the lower end of the holder upon a predetermined amount of flexure of the supporting standard in response to the tug of a hooked fish on the fishing line of a reel which is mounted on the fishing rod.

8 Claims, 4 Drawing Figures

PATENTED JAN 2 1973　　　　　　　　　　　　　　　　3,707,801
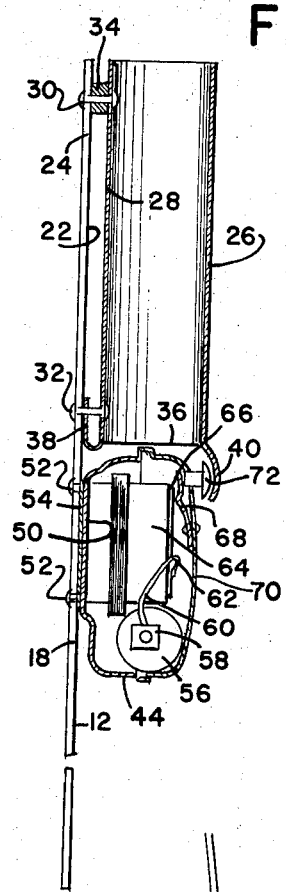
FIG. 3
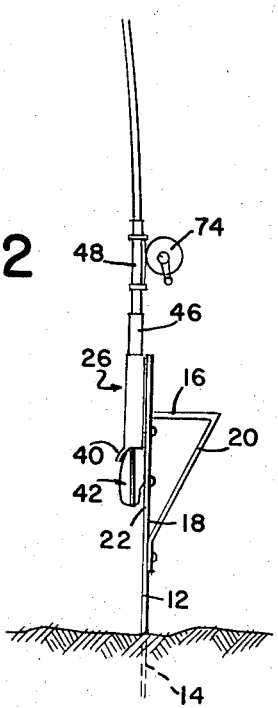
FIG. 2
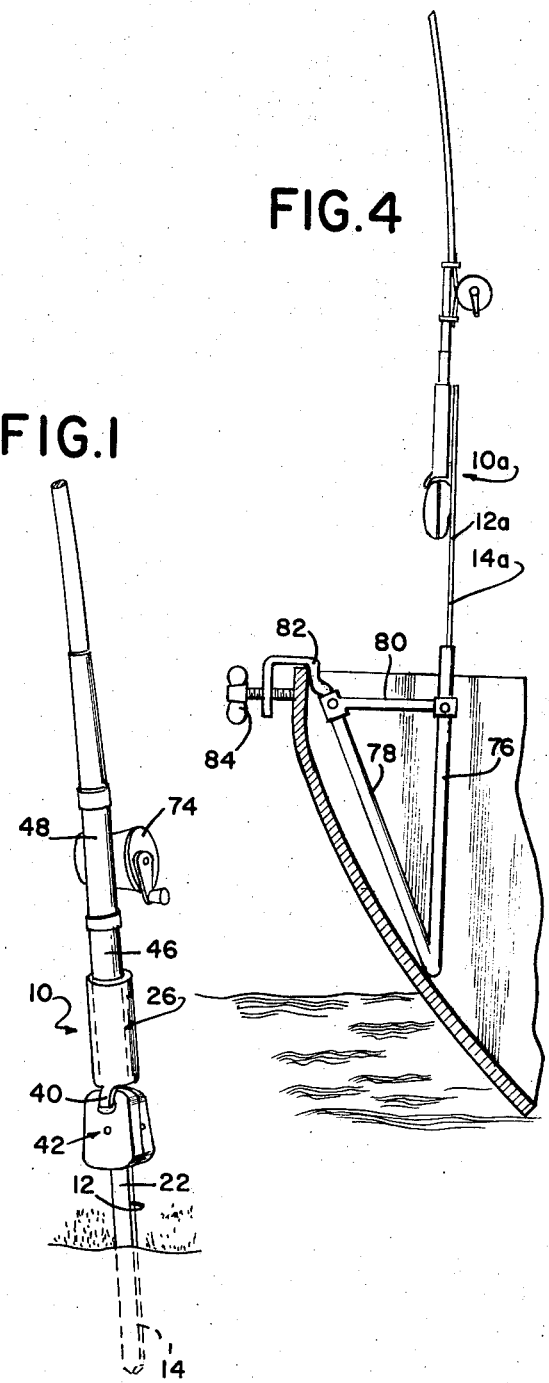
FIG. 4
FIG. 1
INVENTOR.
LOUIS GEDNALSKE

FISHING ROD HOLDER WITH BEEPER

BACKGROUND OF THE INVENTION

1. Field of the Invention

The present invention generally appertains to novel improvements in fishing rod holders and is particularly directed to a new and novel fishing rod holder having a signal or alarm means, preferably of an audible nature, that is activated by the pull of a fish on the hook end of the line carried by a reel that is mounted on the fishing rod.

2. State of the Prior Art

As exemplified by a typical assortment of prior patents, such as U.S. Pat. No. 2,909,860 (Braun, Oct. 27, 1959), U.S. Pat. No. 3,156,997 (Smith, Nov. 17, 1964), U.S. Pat. No. 3,285,360 (Wetsch, Nov. 15, 1966) and U.S. Pat. No. 3,359,672 (Schwartz etal., Dec. 26, 1967) in Class 43, subclass 17 of the Patent Classification System, it is well known and established in the art to provide pivotal fishing rod holders that rock relative to a supporting standard on which a visual or audible alarm is mounted. In such known constructions, a support, such as a standard having means for anchoring it in the ground or on a suitable support, carries a pivotally mounted sleeve or socket member which is supported for pivotal movement on a pivot arrangement provided on and usually projecting from the front face of the supporting standard. The sleeve is adapted to have the handle or butt end of a fishing rod inserted therein and is spring biased by complicated spring assemblies in a set position relative to the front face of the standard and, in particular, relative to a switch button mounted on the standard and connected by leads to a signal or alarm device mounted on the standard. When a fish bites on the hook end of the line, which is carried by a reel mounted on the rod, such pull serves to overcome the set spring force and to move the sleeve about its pivotal axis, transversely of the upstanding supporting standard, and to bring it into direct contact with the switch button that, through the leads, closes an activating circuit for the signal or alarm, which is either audible or visual in nature.

Thus, in essence, such patents disclose a spring biased pivoted holder on a standard that carries an alarm and a switch button therefor, with the button being depressed by the holder when it swings about its pivotal mounting arrangement in response to the pull of a hooked fish and in opposition to the spring means.

In another but basically similar arrangement, as shown in U.S. Pat. No. 2,603,900 (Kellett, July 22, 1952), the fishing rod or pole, itself, is adapted to rock within a holder assembly so as to directly contact the switch button for a visual signal. The handle end of the rod is held within the holder assembly normally away from contact with the switch button by a compression spring means until such spring force is overcome by the pull of a hooked fish at which time the handle end rocks and causes the switch button to be actuated.

In either of such general types of signal arrangements, it is quite apparent that such are necessarily complicated due to the required presence of pivot assemblies and spring biasing arrangements. This renders such prior art signal holders most expensive to manufacture, purchase and use, considering repairs. And while they do well accomplish their intended purpose of warning a fisherman of the presence of a fish on the line, the cost factor is such that the desirability of their use on the part of the average fisherman is far outweighed by the cost factors as well as constant potential breakdowns in usage due to their detailed and complicated constructions involving many parts and movement thereof.

SUMMARY OF THE INVENTION

The primary object of the present invention is to provide a fishing rod holder and signal assembly which possesses all of the functional advantages of the known prior art devices but which overcomes all of the aforementioned drawbacks thereof.

Thus, another important object of the instant invention is to provide an extremely simple, but most efficient and reliable, fishing rod holder and signal assembly which is devoid of a multiplicity of structural components.

Generally stated, the fishing rod holder with its signal means is composed of an elongated inherently flexible but sturdy standard, which can be fabricated from spring steel or plastic or the like sturdy but somewhat flexible material. The standard can be driven into the ground or attached to a boat or other supporting structure. But, in any environment, it is disposed in an upstanding position and has a front or outer face.

An open ended sleeve or tubular rod support is fixedly superimposed on such outer face of the standard so that it lies parallel therewith and is a unitary part thereof. A casing for a signal unit, preferably a battery powered beep type horn, is fixedly attached to the outer face of the standard immediately below the lower open end of the tubular holder. In such position, the casing provides a bottom wall for the tubular holder.

The butt or handle end of a conventional fishing rod is snugly received in the tubular holder and is bottomed on the casing for the signal unit, though the lower end of the tubular holder may have other stop means, such as an internal lip or the like for the purpose of locating the end of the fishing rod therein.

The casing has a front wall which slidably carries a switch actuating button that is adapted, upon being depressed inwardly of the casing, to actuate a leaf spring switch contact so as to close a circuit from a battery, which is housed in the casing, to a beep type horn, which is also housed within the casing, with such circuit being grounded on the casing.

The lower end of the tubular holder has a depending lip or finger integrally formed at the front portion of the edge of its lower end and such lip or finger overlies the button. The finger is adapted to engage and depress the switch button when the standard flexes forwardly in the vicinity of the lower end of the holder under the pulling force of a hooked fish on the hook end of a fishing line carried by a conventional reel that is mounted on the socketed fishing rod.

BRIEF DESCRIPTION OF THE DRAWING

FIG. 1 is a perspective showing of the fishing rod holder and signal assembly of the present invention, with the same being shown staked in the ground and supporting a fishing rod.

FIG. 2 is a side elevational view of the assembly of FIG. 1.

FIG. 3 is a vertical sectional view of the tubular holder and alarm casing mounted on the face of the supporting standard.

FIG. 4 is a side elevational view of the holder and signal assembly mounted on a boat.

DESCRIPTION OF THE PREFERRED EMBODIMENTS

Referring now more particularly to the accompanying drawing, and initially to FIGS. 1-3, the fishing rod holder and bite signal assembly 10 includes a supporting standard 12 which is formed in the desired length from bar stock of steel, plastic or the like sturdy material having an inherent flexibility. The standard has a lower pointed end portion 14 by means of which it can be staked in the ground, as shown in FIGS. 1 and 2. To assist in the driving of the standard into the ground, a lateral foot 16 is fixed to the rear flat face 18 of the standard and is stabilized by a diagonal brace bar 20 so that it is strong enough for the application thereto of a driving force. Usually, the application of force thereon from a user's foot will be sufficient to drive the standard sufficiently far into the ground so that it will not tear out but flex, as will be described. Either on both the lateral foot and its stabilizer bar also can function as convenient carrying means for the assembly 10.

The standard 10 has a front or outer flat face 22 and, at the upper end portion 24 of the standard, an open ended sleeve or tubular rod support 26 is fixedly superposed on the front face in a manner so that it is parallel and in unitary relation with the standard. The tubular support, which may be formed from metal or plastic, has a vertical rear portion 28 which fixedly confronts the front face of the standard and is joined thereto by upper and lower fasteners 30 and 32 in the form of bolt assemblies or rivets. A spacing washer 34 is provided for the upper fastener 30 while the edge of the lower open end 36 of the tubular support has a lip 38 integral with the rear portion 28 and bent out and upwardly to serve as a spacer for the lower fastener assembly 32.

A similar lip or finger 40 is provided on the vertical front portion of the tubular support 26 and integrally depends from the edge of the lower open end 36. The finger 40 is curved slightly outwardly, as shown in FIG. 3.

The assembly 10 further includes a signal or alarm means which is shown as an audible alarm. The alarm 42 is a self-contained unit which is housed in a casing 44. The casing 44 is fixed to the front face 22 of the standard immediately below the lower end 36 of the tubular support and closes off such end in a way to serve as a bottom therefor and, consequently, a locating stop for the butt on handle end 46 of a fishing rod 48 that is snugly socketed in the tubular holder.

The casing 44 has a rear wall 50 that is fastened by screws 52 to the front face of the standard 12 with a felt or rubber shim 54 interposed between the rear wall of the casing and the front face 22 of the standard. The casing contains a battery cradle which supports a standard flashlight battery 56 and from the positive contact 58 of which a lead 60 extends to a contact 62 for a conventional beep type horn. The horn is of the diaphragm type and is carried by the inside of the rear wall 50 of the casing and it has another contact 66 which is adapted to be engaged by a leaf spring switch 68 that is mounted on the inside of the front wall 70 of the casing.

A switch actuator button 72 is slidably disposed through the front wall of the casing and has an outer head that is disposed so that it underlies the finger 40. The button is adapted to be engaged and depressed by the finger 40 when the standard flexes sufficiently under the load of a fish biting or caught on the hook end of the reel line.

Thus, in use, with the standard securely anchored in the ground and the fishing rod socketed at its butt end in the tubular holder, a pull on the line from the reel 74, as caused by a hooked fish, will impose a bending moment on the rod 48 and this will be transferred to and cause the standard 12 to flex in the vicinity of the lower end portion of the tubular holder, thereby moving the finger 40 into depressive activation of the button 72 so as to close the energizing circuit for the horn and cause the same to emit a beep.

In the form of FIG. 4, the lower end portion 14a of the standard 12a for the rod holder and bite signal assembly 10a, which is identical to the assembly or unit 10 of FIGS. 1-3, upstands from or can be an integral prolongation of a rod 76 that is in integral V-shaped relation with a divergent brace rod 78. The rods 76 and 78 are braced at their outer divergent ends by a cross bar 80. The upper or outer end of the rod 78 terminates in a clamp 82 that is adapted to fit over the upper edge portion of the side of a boat or over any other supporting structure and to be detachably affixed thereto by a clamping screw 84.

It can be appreciated from the foregoing that, in either the ground staked form of FIGS. 1-3 or in the structure mounted form of FIG. 4, a very simple and uncomplicated rod holder and signal assembly or unit is disclosed whereby a fishing rod can be securely held and whereby the presence of a bite on the line will be announced to a fisherman in a dependable and effective way. While a beep type horn has been disclosed, since such is deemed most effective, for night fishing, a light can be substituted for the horn so that a visual signal will be given by the signal or alarm unit 42. Also, such alarm unit need not form the bottom for the tubular rod holder 26 which could be formed with additional integral lips, like the lips 38 and 40, with such additional lips being radially inturned to underlie the bore of the holder and form bottom stops.

Thus, while the preferred forms of the present invention have been shown and described herein, various changes may be made, apart from the specific "Abstract," as come within the spirit and scope of the appended claims.

What is claimed is:

1. A fishing rod holder and bite signal assembly comprising an elongated substantially flat standard of inherently flexible but sturdy material, said standard being adapted to be vertically disposed and having a lower and an upper end portion, means for anchoring said standard at its lower end portion in a vertically upstanding position on an anchorage with said standard having an outer, front face and a rear face in such anchored position, a tubular rod holder fixedly superposed on the front face of the standard at its upper end portion and arranged parallel with said standard and adapted to receive and support the handle end of a fishing rod carrying a reel and line, a signal means anchored to the front face of the standard below the tubular rod holder and having an activating element projecting outwardly from the front face of the standard and an operating element carried by the lower end of the tubular rod holder and overlying the activating element and adapted to engage and actuate the same to operate the signal means upon a forward flexing of the standard in the vicinity of the lower end of the tubular rod holder in response to a pull on the line from the fishing rod so as to indicate the bite of a fish on the line.

2. The invention of claim 1 wherein said tubular rod holder has upper and lower open ends and snugly receives the handle end of the fishing rod and stop means provided at the lower end of the tubular holder for locating the rod handle therein.

3. The invention of claim 2 wherein said signal means includes a casing attached to the outer face of the standard immediately below the open lower end of the tubular holder and constituting the stop means.

4. The invention of claim 1 wherein said signal means includes a casing having a back wall and a front wall, means fixing the back wall to the outer face of the standard, an electrically operable signal element housed in said casing, a battery housed in said casing, electrical circuit means connecting said battery and signal element and including a pressure responsive circuit closure which is normally open, said activating element being a button slidably mounted in the front wall of the casing and adapted to apply pressure to the circuit closure upon inward movement thereof under the force of the operating element.

5. The invention of claim 4 wherein said signal element is a beep type horn.

6. The invention of claim 4 wherein said tubular rod holder has a front portion and said operating element includes a finger integrally depending from the front portion of the lower end and overlying the button to depress the same upon forward flexing of the standard.

7. The invention of claim 1 wherein said anchoring means includes said lower end portion of the standard being pointed for staking in the ground and means laterally extending from the rear face of the standard for the application of ground penetrating force to the standard.

8. The invention of claim 1 wherein said anchoring means includes a clamping means supporting the lower end portion of the standard and adapted to be attached to a supporting structure.

* * * * *